US008048215B2

(12) United States Patent
Davies et al.

(10) Patent No.: US 8,048,215 B2
(45) Date of Patent: *Nov. 1, 2011

(54) PRIMER COATING OF STEEL

(75) Inventors: Gerald Howard Davies, Newcastle Upon Tyne (GB); Gillian Diane Davies, legal representative, Newcastle Upon Tyne (GB); Peter Harry Johan Greenwood, Gotenborg (SE); Paul Anthony Jackson, County Durham (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/380,129

(22) PCT Filed: Sep. 11, 2001

(86) PCT No.: PCT/EP01/10552
§ 371 (c)(1),
(2), (4) Date: Jun. 20, 2003

(87) PCT Pub. No.: WO02/22745
PCT Pub. Date: Mar. 21, 2002

(65) Prior Publication Data
US 2004/0037964 A1  Feb. 26, 2004

(30) Foreign Application Priority Data
Sep. 13, 2000 (EP) .................................. 00307957

(51) Int. Cl.
*C09D 1/02* (2006.01)
*B05D 7/00* (2006.01)
(52) U.S. Cl. .................. 106/286.2; 427/419.2
(58) Field of Classification Search ............... 427/397.7, 427/397.8, 403–406, 419.1–419, 409, 419.2; 528/10, 16; 106/286.2, 286.7, 286.8, 287.1, 106/287.12, 287.17
See application file for complete search history.

(56) References Cited

U.S. PATENT DOCUMENTS

| | | | |
|---|---|---|---|
| 2,998,328 A | 8/1961 | Munger et al. ................. 117/70 |
| 3,130,061 A * | 4/1964 | McMahon et al. ............ 106/623 |
| 3,142,583 A * | 7/1964 | McMahon et al. ............ 428/560 |
| 3,180,746 A | 4/1965 | Patton et al. ................... 106/74 |
| 3,258,346 A | 6/1966 | Fisher, Jr. ...................... 106/14 |
| 3,320,082 A | 5/1967 | McMahon et al. ............ 106/287 |
| 3,345,194 A | 10/1967 | Weldes et al. ................ 106/287 |
| 3,392,039 A | 7/1968 | Cuneo, Jr. ....................... 106/84 |
| 3,455,709 A | 7/1969 | Sears |
| 3,522,066 A | 7/1970 | Forsyth .......................... 106/74 |
| 3,549,375 A | 12/1970 | Sears et al. |
| 3,620,784 A | 11/1971 | Schutt ............................ 106/84 |
| 3,634,286 A * | 1/1972 | Yates .............................. 516/77 |
| 3,715,224 A | 2/1973 | Campbell ........................ 106/74 |
| 3,721,574 A * | 3/1973 | Schneider et al. ............ 106/623 |
| 3,745,126 A * | 7/1973 | Moore, Jr. ........................ 516/87 |
| 3,793,055 A | 2/1974 | Shodai et al. .............. 117/47 R |
| 3,893,864 A | 7/1975 | Beers .............................. 106/1 |
| 3,977,888 A | 8/1976 | Sano et al. ...................... 106/74 |
| 4,006,030 A | 2/1977 | Yoshida et al. ................. 106/74 |
| 4,086,096 A | 4/1978 | McLeod ...................... 106/1.17 |
| 4,162,169 A | 7/1979 | Schutt ........................... 106/74 |
| 4,190,449 A * | 2/1980 | Naoi et al. .................... 430/539 |
| 4,230,496 A | 10/1980 | Falcone, Jr. et al. ....... 106/14.21 |
| 4,277,284 A | 7/1981 | Ginsberg et al. ............ 106/1.05 |
| 4,479,824 A | 10/1984 | Schutt ....................... 106/14.21 |
| RE32,250 E | 9/1986 | Plueddemann ............ 252/389.1 |
| 4,818,595 A * | 4/1989 | Ellis ................................ 442/68 |
| 4,888,056 A | 12/1989 | van der Kolk et al. ....... 106/1.17 |
| 4,902,442 A | 2/1990 | Garces ....................... 252/313.2 |
| 4,917,960 A * | 4/1990 | Hornberger et al. .......... 428/550 |
| 5,091,224 A | 2/1992 | Kushida et al. ............. 427/419.4 |
| 5,221,497 A | 6/1993 | Watanabe et al. ........... 252/313.2 |
| 5,246,488 A | 9/1993 | Tanaka et al. .............. 106/14.44 |
| 6,329,059 B1 | 12/2001 | Karchevsky et al. ......... 428/414 |
| 6,337,036 B1 | 1/2002 | Karchevsky et al. ......... 252/512 |
| 6,468,336 B1 | 10/2002 | Fiedler et al. |
| 6,482,536 B1 | 11/2002 | Tanaka et al. ................. 428/626 |
| 6,634,576 B2 * | 10/2003 | Verhoff et al. ................... 241/21 |

FOREIGN PATENT DOCUMENTS

| | | |
|---|---|---|
| EP | 0 295 834 A1 | 12/1988 |
| GB | 997094 | 6/1965 |
| GB | 1007481 | 10/1965 |
| GB | 1 226 360 | 3/1971 |
| GB | 1 485 169 | 9/1977 |
| GB | 1 541 022 | 2/1979 |
| GB | 2 100 744 A | 1/1983 |
| JP | 1980-100921 | 1/1980 |
| JP | 55-100921 | 8/1980 |
| JP | 55-106271 | 8/1980 |
| JP | 6-200188 | 7/1994 |
| JP | 7-70476 | 3/1995 |
| KR | 8101300 | 10/1981 |
| WO | WO 88/06177 | 8/1988 |
| WO | WO 98/58028 | 12/1998 |
| WO | WO 00/55261 | 9/2000 |
| WO | WO 02/22745 A1 | 3/2002 |

OTHER PUBLICATIONS

International Preliminary Examination Report PCT/EP01/10552 dated Jan. 10, 2003.
International Search Report PCT/EP01/10635 dated Jan. 24, 2002.
Written Opinion of PCT/EP01/10552 dated Jul. 25, 2002.
Written Opinion of PCT/EP01/10552 dated Apr. 10, 2002.
Patent Abstracts of Japan abstracting JP 55-106271 (1980).

(Continued)

*Primary Examiner* — William Phillip Fletcher, III
(74) *Attorney, Agent, or Firm* — Kenyon & Kenyon LLP

(57) ABSTRACT

A process for primer coating steel which is intended to be fabricated and overcoated, in which process the steel is primer coated with a primer coating comprising a silica binder. The binder comprises alumina-stabilized aqueous silica sol and, optionally, a minor amount of alkali metal silicate. The binder has a $SiO_2/M_2O$ mole ratio, wherein M represents the total of alkali metal and ammonium ions, of at least 6:1. After the primer coating has dried to the extent that it is touch dry, it is optionally treated with a solution which increases the film strength of the primer coating.

11 Claims, No Drawings

OTHER PUBLICATIONS

Patent Abstracts of Japan abstracting JP 06-200188 (1994).
Patent Abstracts of Japan abstracting JP 07-070476 (1995).
Abstract of KR8100661 from EPO on-line data base esp@cenet.
Iler, Ralph K., "The Chemistry of Silica," John Wiley & Sons (1979), title page and pp. 407-409.
Sears, Jr., G. W., "Determination of Specific Surface Area of Colloidal Silica by Titration with Sodium Hydroxide," Analytical Chem., vol. 28, No. 12 (1956), pp. 1981-1983.
USPTO's office communication dated Jan. 14, 2004 referencing U.S. Appl. No. 09/936,794.
USPTO's office communication dated Aug. 23, 2004 referencing U.S. Appl. No. 09/936,794.
English language translation of Japanese Laid-Open No. 1976-73029; laid open date Jun. 24, 1976.
English language translation of Japanese Laid-Open No. 1976-79125; laid open date Jul. 9, 1976.
Derwent Abstract 66:56644 abstracting NL 6604385.
Derwent abstract 85:165408 abstracting JP 51073029.
Derwent abstract 85:181302 abstracting JP 51079125.
Derwent abstract 86:91877 abstracting JP 51150533.
Derwent abstract 1980-68747C/198039 abstracting JP 55106271-A.
Derwent abstract 1994-269638/199433 abstracting JP 06200188-A.
Derwent abstract 1995-145041/199519 abstracting JP 07070476-A.
International Search Report for Application No. PCT/EP00/02473 dated Jun. 27, 2000.
Definition of "dispersion" from Hawley's Condensed Chemical Dictionary, 12$^{th}$ Edition, © 1993 by Van Nostrand Reinhold, p. 435.
Definition of "colloid chemistry" from Hawley's Condensed Chemical Dictionary, 12$^{th}$ Edition, © 1993 by Van Nostrand Reinhold, pp. 300-301.
Iler, Ralph K., "Lithium Silicates," Chapter 2, pp. 145-150.
Iler, Ralph K., Table 4.3. Properties of Commercial Silica Sols Listed by Manufacturer, pp. 416-418.
Interview Summary mailed Dec. 4, 2007; 3 pages; U.S. Appl. No. 10/380,130.
Response to Non-Final Office Action filed on Nov. 28, 2007; 20 pages; U.S. Appl. No. 10/380,130.
Non-Final Office Action mailed Aug. 28, 2007; 10 pages; U.S. Appl. No. 10/380,130.
Non-Final Office Action mailed Jan. 30, 2008; 11 pages; U.S. Appl. No. 10/380,130.
Final Office Action mailed Jul. 31, 2008; 13 pages; U.S. Appl. No. 10/380,130.
Advisory Action mailed Oct. 8, 2008; 4 Pages; U.S. Appl. No. 10/380,130.
DuPont, Industrial Chemical Department, "Lithium Polysilicate Zinc-Rich Paint Vehicles," (Oct. 1974), pp. 1-7.
Baehr, C.H. et al., "Soluble Silicates—Highly Versatile and Safe," SÖFW International Journal for Applied Science (Apr. 2007), pp. 88-94.
PQ Corporation, Bulletin 17-110, "Lithium Silicates," (2005) 1 page.
INEOS Silicas, "Soluble Silicas and their Applications," Issue 1 (Dec. 2002) SCT 204, pp. 1-7.
Iler, R.K. *The Chemistry of Silica—Solubility, Polymerization, Colloid and Surface Properties, and Biochemistry*, John Wiley & Sons, New York (Jun. 1979), Table of Contents, pp. xi-xix; and "Solutions of Polysilicates," pp. 143-149; "Colloidal Silica-Concentrated Sols," pp. 312-313; "Aggregation of Particles," p. 367.
Non-Final Office Action mailed Oct. 27, 2008, U.S. Appl. No. 10/380,130.
Non-Final Office Action mailed Feb. 12, 2009, U.S. Appl. No. 10/380,130.
Final Office Action mailed Jun. 22, 2009, U.S. Appl. No. 10/380,130.
Non-Final Office Action mailed Nov. 11, 2009, U.S. Appl. No. 10/380,130.
Final Office Acton mailed May 18, 2010, U.S. Appl. No. 10/380,130.
Advisory Action mailed Aug. 20, 2010, U.S. Appl. No. 10/380,130.
Non-Final Office Action mailed Oct. 4, 2010, U.S. Appl. No. 10/380,130.
Final Office Action mailed Mar. 22, 2011, U.S. Appl. No. 10/380,130.

* cited by examiner

PRIMER COATING OF STEEL

This application is the national phase of PCT/EP01/10552, filed Sep. 11, 2001, which claims the benefit of European Patent Application No. 00307957.1, filed Sep. 13, 2000.

FIELD OF THE INVENTION

This invention relates to a process for the primer coating of steel. In particular, it relates to the coating of semi-finished steel products which are subsequently to be fabricated by heat-intensive processes and overcoated.

BACKGROUND OF THE INVENTION

Such semi-finished steel products are used in the shipbuilding industry and for other large-scale structures such as oil production platforms and include steel plates, for example of thickness 6 to 75 mm, bars, girders, and various steel sections used as stiffening members. The most important heat-intensive process is welding; substantially all such semi-finished steel products are welded. Other important heat-intensive processes are cutting, for example oxy-fuel cutting, plasma cutting or laser cutting, and heat fairing, where the steel is bent into shape while being heated. These steel products are often exposed to the weather during storage before construction and during construction, and they are generally coated with a coating called a "shop primer" or "pre-construction coating" to avoid corrosion of the steel occurring before the steel construction, e.g. ship, is given its full coating of anti-corrosive paint, thereby avoiding the problem of having to overcoat or remove steel corrosion products. In most big shipyards, the shop primer is applied as one of several treatments carried out on a production line in which the steel is, for example, preheated, shot- or grit-blasted to remove mill scale and corrosion products, shop primed, and passed through a drying booth. Alternatively, the shop primer can be applied by a trade coater or steel supplier before the steel is delivered to the shipyard or other construction site.

Although the main purpose of the shop primer is to provide temporary corrosion protection during construction, it is preferred by shipbuilders that the shop primer does not need to be removed but can remain on the steel during and after fabrication. Steel coated with shop primer thus needs to be weldable without removal of the shop primer and to be overcoatable with the types of protective anti-corrosive coatings generally used on ships and other steel constructions, with good adhesion between the primer and the subsequently applied coating. The shop primed steel should preferably be weldable without any significant detrimental effect on the quality of the weld or on the speed of the welding process and should be sufficiently resistant to heat for the shop primer to retain its anticorrosive properties in areas heated during fairing or during welding of the opposite face of the steel.

Commercially successful shop primers available today are solvent borne coatings based on prehydrolyzed tetraethyl orthosilicate binders and zinc powder. Such coatings contain a large proportion of volatile organic solvent, typically about 650 grams per liter, to stabilize the paint binder and to enable the product to be applied as a thin film, typically of about 20 microns thick. Release of volatile organic solvent can be harmful to the environment and is regulated by legislation in many countries. There is a need for a shop primer which releases no, or much less, volatile organic solvent. Examples of such coatings are described in U.S. Pat. No. 4,888,056 and JP-A-7-70476.

JP-A-6-200188 is concerned with shop primer coatings and mentions the possibility of using an aqueous alkali silicate salt-type binder. Coatings comprising an aqueous alkali metal silicate and zinc powder are also proposed in GB-A-1226360, GB-A-1007481, GB-A-997094, U.S. Pat. No. 4,230,496, and JP-A-55-106271. Alkali silicate binders for anticorrosive coatings are also mentioned in U.S. Pat. No. 3,522,066, U.S. Pat. No. 3,620,784, U.S. Pat. No. 4,162,169, and U.S. Pat. No. 4,479,824. In EP-A-295 834 coatings containing a mixture of alkali metal silicate with a minor amount of colloidal silica, $Al_2O_3$ powder as filler, and metal powder as toughening agent are mentioned. U.S. Pat. No. 3,721,574 suggests coatings containing a mixture of alkali metal silicate with a minor amount of colloidal, preferably $Al_2O_3$ modified silica, and zinc dust. We have found that primer coatings based on an aqueous alkali silicate binder containing zinc powder can give adequate corrosion protection and allow the steel surfaces they cover to be welded, but give rise to problems when overcoated. The aqueous silicates contain a large quantity of alkali metal cations, which are required to keep the silicate in aqueous solution, and these ions are still present in the coating after it has dried. We have found that, if primer coatings having these large quantities of alkali metal ions are overcoated with any conventional organic coating and then immersed in water, blistering (local delamination of the coating) occurs. We have performed tests which show that this problem can be reduced if the coating is weathered outside for some time after application of the shop primer or washed prior to overcoating. However, these processes are not compatible with use in today's high productivity shipyards.

Aqueous silica sols having a very low alkali metal ion content are available commercially, but coatings based on such sols normally have very poor (initial) film strength in terms of adhesion, cohesion, hardness, and resistance to abrasion and water. These poor physical properties of the coating make it susceptible to damage during handling or further processing. This brings the potential requirement of significant coating repair with major cost implications. Suggested improvements to silica sol coatings are described in U.S. Pat. No. 3,320,082, which adds a water-immiscible organic amine, GB-A-1541022, which adds a water-soluble acrylamide polymer, GB-A-1485169, which adds a quaternary ammonium or alkali metal silicate, and JP 55 100921, which adds clay materials and/or metal oxides such as $Al_2O_3$, and aluminium biphosphate and/or ethyl silicate. However, such coatings have not achieved physical properties similar to those of coatings based on alkali metal silicates. Coatings based on silica sols show low levels of blistering when overcoated/immersed. Although the water-soluble salt content and osmotic pressure are low, blistering can still occur, as the coating exhibits little resistance to blister initiation/growth due to its poor physical properties.

There is a need for a water based shop primer of low alkali metal ion content which has improved adhesion to substrates and improved film strength in terms of the properties discussed above to resist blister initiation and growth.

Further, there is a need for a blister-free water based shop primer showing fast development of the physical properties of the coating after application of the shop primer to enable handling and further processing of the substrate without the risk of damaging the coating.

Also the pot life of the composition is important. To broaden the application possibilities of these coatings, the pot life should be as long as possible.

SUMMARY OF THE INVENTION

The process according to the present invention for primer coating of steel which is intended to be fabricated and overcoated provides a solution to the above-mentioned problems/disadvantages. The process according to the present invention for primer coating the steel with a primer coating comprising a silica binder is characterized in that the binder comprises an alumina-stabilized aqueous silica sol and, optionally, a minor amount of alkali metal silicate, said binder having a $SiO_2/M_2O$ mole ratio, wherein M represents the total of alkali metal and ammonium ions, of at least 6:1, and wherein after the primer coating has dried to the extent that it is touch dry, it is optionally treated with a film-strengthening solution.

The present invention also relates to the primer coating that is used in this process.

For the purpose of the present invention, a film-strengthening solution is a solution that enhances the film strength of a primer coating and/or accelerates the development of the film strength with time.

In this application, the concentration of alumina in the coating composition is given as the percentage by weight of $Al_2O_3$, based on the silica sol or silicate particles in the composition.

DETAILED DESCRIPTION OF THE INVENTION

The process for the primer coating of steel of the invention does not include a primer coating consisting of 25.8% by weight of an alumina-modified sol having an average particle size of 12 nm and $SiO_2/Na_2O$ mole ratio 125:1, 20.4% by weight of water, 0.2% by weight of Bentonite clay thixotrope, 45.5% by weight of zinc dust, and 8.1% by weight of a calcined aluminium silicate extender pigment of 1.4 µm mean particle size, and wherein after the primer coating has dried at 20° C. and 35% relative humidity to the extent that it is touch dry it is sprayed with 0.2 g of an aqueous 5% by weight of potassium chloride solution and subsequently dried at 15-20° C. and 35% relative humidity.

The binder is most preferably based on an aqueous silica sol. Such sols are available from Akzo Nobel under the Registered Trademark "BINDZIL" or from DuPont under the Registered Trademark "LUDOX", although the literature concerning them emphasizes that conventional grades of colloidal silica are not good film formers. Various grades of sol are available having various colloidal silica particle sizes and containing various stabilizers. The particle size of the colloidal silica can for example be in the range 3 to 100 nm; particle sizes towards the lower end of this range, for example 5 to 22 nm, are preferred. More preferred are particle sizes between 3 and 15 nm, even more preferred between 3 and 10 nm. The silica sol preferably has a $SiO_2/M_2O$ mole ratio of at least 25:1, more preferably of at least 50:1, and may have a $SiO_2/M_2O$ mole ratio of 200:1 or more. Further, it is possible to use a blend of two or more silica sols having a different $SiO_2/M_2O$ mole ratio, wherein the $SiO_2/M_2O$ mole ratio of the blend is at least 25:1. M represents the total of alkali metal and ammonium ions, wherein M can be, for example, Na, K, Li, etc. The sol can be stabilized by alkali, for example sodium, potassium, or lithium hydroxide or quaternary ammonium hydroxide, or by a water-soluble organic amine such as alkanolamine. The coating composition should preferably be substantially free of any ammonium-stabilized silica sol, since the presence of an ammonium-stabilized sol could result in gelling of the composition, in particular when the binder mainly consists of ammonium stabilized silica sol and the coating composition also contains zinc powder.

To improve its pot life, the coating composition comprises alumina-stabilized sol. For the purpose of the present application, pot life is defined as a 50% reduction in the film properties of the coating when tested 1 hour after application.

To obtain optimum properties, preference is given to the use of alumina-modified silica sols, for example a silica sol modified with 0.05 to 2.0 wt % of alumina. In these sols, which are also referred to as Al surface-modified silica sol(s), the surface of the particles is modified by sodium aluminate bound to the particles.

To obtain an Al surface-modified silica sol, the surface of the silica sol particles can be modified with alumina in a way described, for example, by R. K. Iler in *The Chemistry of Silica* (John Wiley and Sons, 1979), 407-409.

The surface of the silica sol particles used in the examples of this patent specification was modified in the following way. A certain amount of silica sol with pH ~10 was deionized by being passed through a strong cation exchange column. The resultant deionized sol had pH ~2. Three parts by weight of this deionized sol with pH ~2 were added to two parts by weight of non-deionized silica sol with pH ~10 and vigorously stirred. The obtained mixture had a pH of 7.5-8. Then, 30 minutes after preparation of the mixture, about one part by weight of a sodium aluminate solution (10% by weight in deionized water) was added to the mixture under vigorous stirring. Addition of the aluminate resulted in an increase in the pH of the mixture to pH ~10. Other methods are available to the person skilled in the art to obtain an alumina modified silica sol.

The optimum alumina concentration in the composition is a balance between pot life and coating properties. Higher levels of alumina lead to a longer pot life but can also lead to a reduction of the rate of development of the coating properties.

The silica sol can be blended with a minor amount of an alkali metal silicate, for example lithium silicate, sodium-lithium silicate or potassium silicate, or with quaternary ammonium silicate. Other examples of suitable sol-silicate blends or mixtures can be found in U.S. Pat. No. 4,902,442. The addition of an alkali metal or ammonium silicate may improve the initial film-forming properties of the silica sol, but the amount of alkali metal silicate should be low enough to have a $SiO_2/M_2O$ mole ratio of the binder sol of at least 6:1, preferably of at least 8:1, and most preferably above 15:1. For the purpose of the present application, a minor amount of alkali metal silicate means that the weight ratio of alkali metal silicate to silica sol in the composition is smaller than 0.5, preferably smaller than 0.25, more preferably smaller than 0.1.

The silica sol can alternatively or additionally contain a dissolved or dispersed organic resin. The organic resin preferably is a latex, for example a styrene butadiene copolymer latex, a styrene acrylic copolymer latex, a vinyl acetate ethylene copolymer latex, a polyvinyl butyral dispersion, a silicone/siloxane dispersion, or an acrylic based latex dispersion. Examples of suitable latex dispersions that can be used include XZ94770 and XZ94755 (both ex Dow Chemicals), AIRFLEX® 500, AIRFLEX® EP3333 DEV, AIRFLEX® CEF 52, and FLEXCRYL® SAF34 (all ex Air Products), PRIMAL® E-330DF and PRIMAL® MV23 LO (both ex Rohm and Haas), and SILRES® MP42 E, SILRES® M50E, and SLM 43164 (all ex Wacker Chemicals). Water-soluble polymers such as acrylamide polymers can be used but are less preferred. The organic resin is preferably used at up to 35% by weight, based on solid binder. For compositions comprising a binder having colloidal silica particles with an average size equal or below 10 nm, the organic resin is preferably used up to 20% by weight, more preferably 1-15% by weight, based on solid binder. For compositions comprising a binder having colloidal silica particles with an average particle size above 10 nm, for example between 12 and 22 nm, or between 12 and 16 nm, an increased level of organic resin of up to 35% by weight on solid binder is preferred. Higher amounts of organic resin may cause weld porosity during subsequent welding. It was found that the addition of an organic resin improves the adhesion/cohesion as measured in the cross hatch test.

Alternatively, the silica sol can contain a silane coupling agent which contains alkoxysilane groups and an organic moiety containing a functional group such as an amino, epoxide or isocyanate group. The silane coupling agent preferably is an aminosilane such as gamma-aminopropyl triethoxy silane or gamma-aminopropyl trimethoxy silane, or a partial hydrolysate thereof, although an epoxy silane such as gamma-glycidoxypropyl trimethoxy silane can also be used. The silane coupling agent preferably is present at up to 30% by weight, for example 1-20% by weight, based on silica.

The binder of the primer coating can additionally comprise an aqueous solution of an alkali metal or ammonium silicate stabilized by a siliconate substituted by at least one anionic group of lower pKa than silicic acid, such as a carboxylate or sulphonate group. Such a binder preferably is a solution having a $SiO_2/M_2O$ mole ratio in the range 8:1 to 30:1 and a pH in the range 7 to 10.5 prepared by lowering the pH of a solution of silicate and siliconate by cation exchange. Thus the siliconate can be added at relatively low levels, for example at a molar ratio of 1:2 to 1:20, to a conventional 3.9:1 $SiO_2/K_2O$ alkali silicate. The solids may then be reduced to improve ease of processing and to further improve stability. At this stage, the solution has a pH of 12-12.5. The solution is ion-exchanged using a standard ion-exchange resin. $K^+$ ions are replaced with $H^+$ reducing both the alkali content of the binder and the pH. Without the presence of the siliconate the silicate would gel on reducing the pH. Clear, stable solutions with a pH as low as 8 have been obtained. The resultant binder has a $SiO_2/K_2O$ mole ratio typically in the range 8-20:1 and can be concentrated if desired to increase the solids. The binder is a clear, stable solution and is stable in the presence of zinc, but coatings based on these ion-exchanged binders have relatively poor film strength compared to coatings based on alkali silicate binders.

Preferably, a binder having a pH in the range 9 to 11.5 is used, more preferably in the range 9.5 to 11. While we do not wish to be bound by any theory explaining the pH effect on the film properties, it appears that an increased pH results in an increased amount of soluble silica in solution. This seems to have the potential for effecting in situ gel reinforcement after application of the coating composition. Additionally, pH adjustment can have a minor pot life-extending effect. When a commercially obtainable silica sol is used, a sol with a high pH can be selected and/or the pH of the sol can be adjusted. The pH can be adjusted, for example, by altering the amount of $Al_2O_3$, or by adding pH-influencing pot life extenders such as dimethyl amino ethanol (DMAE), or by adding dilute sulphuric acid, or by adding sodium hydroxide.

For example, commercially obtainable 22 nm silica sols normally have a pH of about 8.5 to 9. Increasing the pH range of these sols to 10 to 11 markedly improves the rate of coating property development.

The primer coating preferably contains zinc powder and/or a zinc alloy. Such zinc powder preferably has a volume averaged mean particle size of 2 to 12 microns and most preferably such zinc powder is the product commercially as zinc dust having a mean particle size of 2 to 8 microns. The zinc powder protects the steel by a galvanic mechanism and may also form a protective layer of zinc corrosion products enhancing the corrosion protection given by the coating. All or part of the zinc powder can be replaced by a zinc alloy. The amount of zinc powder and/or alloy in the coating generally is at least 10% and may be up to 90% by volume of the coating on a dry film basis. The zinc powder and/or alloy can be substantially the whole of the pigmentation of the coating or can for example comprise up to 70%, for example 25 to 55%, by volume of the coating on a dry film basis, with the coating also containing an auxiliary corrosion inhibitor, for example a molybdate, phosphate, tungstate or vanadate, as described in U.S. Pat. No. 5,246,488, ultrafine titanium dioxide as detailed in KR 8101300, and/or zinc oxide and/or a filler such as silica, calcined clay, alumina silicate, talc, barytes, mica, magnesium silicate, or calcined aluminum silicate.

For compositions comprising a binder having colloidal silica particles with an average particle size equal to or below 10 nm, the amount of zinc powder and/or alloy in the coating is between 40 and 60%, preferably between 45 and 55% by volume of the coating on a dry film basis. For compositions comprising a binder having colloidal silica particles with an average particle size above 10 nm, for example between 12 and 22 nm, or between 12 and 16 nm, the amount of zinc powder and/or alloy in the coating preferably is between 35 and 50%.

However, other pigments can be used in conjunction with zinc-based pigments. Examples of these other non-zinc pigments include conductive extenders such as di-iron phosphide (FERROPHOS®), micaceous iron oxide, etc. Use of these conductive non-zinc pigments may allow a reduction in the zinc level maintaining effective corrosion protection. To obtain optimum coating properties, extenders are preferably sufficiently dispersed in the coating composition. The types and sizes of the extenders used can be adjusted to obtain an adequate state of dispersion. For example, when the extender pigment SATINTONE (ex Lawrence Industries) is selected, a mean particle size below 3 µm, preferably below 2 µm, should be used.

Preferably, the pigment volume concentration (PVC) of the coating is between 40 and 75%. Above 75% film properties are reduced, and below 40% there is insufficient zinc to provide effective corrosion protection. For compositions comprising a binder having colloidal silica particles with an average particle size below 10 nm, the PVC preferably is between 55 and 75%, more preferably between 65 and 75%. For compositions comprising a binder having colloidal silica particles with an average particle size equal to or above 10 nm, improved early coating properties can be obtained using coatings with a PVC between 40 and 65%, more preferably between 45 and 55%.

The pigment volume concentration (PVC) is the volume percentage of pigment in the dry paint film. The critical pigment volume concentration (CPUC) is normally defined as the pigment volume concentration where there is just sufficient binder to provide a completely adsorbed layer of binder on the pigment surfaces and to fill all the interstices between the particles in a close-packed system. The critical pigment volume concentration can be determined by wetting out dry pigment with just sufficient linseed oil to form a coherent mass. This method yields a value known as the "oil absorption", from which the critical pigment volume concentration can be calculated. The method for determining the oil absorption is described in British Standard 3483 (BS3483).

The solids content of the primer coating generally is at least 15% by volume and preferably in the range of 20 to 35% by volume. The volume solids content is the theoretical value calculated on the basis of all the components present in the coating composition. The coating preferably has a viscosity such that it can easily be applied by conventional coating applicators such as spray, particularly airless spray or high volume low pressure (HVLP) spray applicators, to give a coating having a dry film thickness of less than 40 microns, preferably between 12 and 25 to 30 microns.

Optionally, the coating composition may comprise further additives well-known to the skilled person, e.g., thixotropes and/or rheology control agents (organo clays, xanthan gum, cellulose thickeners, polyether urea polyurethanes, acrylics, etc.), defoamers (in particular when latex modifiers are present), and, optionally, secondary pot life extenders, such as chromates (for example sodium dichromate) or tertiary amines (for example triethylamine or dimethyl aminoethanol). Preferred thixotropes and/or rheology control agents include BENTONE EW (ex ELEMENTIS), which is a sodium magnesium silicate (organo clay), BENTOLITE WH (ex Rockwood), which is a hydrous aluminium siliate, LAPONITE RD (ex Rockwood), which is a hydrous sodium magnesium lithium silicate, and RHEOLATE 425 (ex ELEMENTIS), which is a proprietary acrylic dispersion in water. Preferred defoamers include FOAMASTER NDW (ex COGNIS) and DAPRO 1760 (ex ELEMENTIS). It was found that other compounds which can be present in the coating composition for other reasons can also act as secondary pot life extenders. For example, the addition of molywhite anticorrosive pigments or styrene butadiene latex can lead to a minor extension of the pot life. Preferred secondary pot life extenders are tertiary amines which offer a chromate-free option for pot life extension.

Normally the coating system is provided as a two- (or more) component system, where the components are thoroughly mixed prior to application of the coating.

When a composition with a viable pot life has been obtained, the rate of film property development depends on the way an applied coating layer is subsequently dealt with.

To achieve a fast development of properties, the primer coating can be post-treated with a film-strengthening solution. In such process, the primer coating is dried to the extent that it is touch dry before it is treated with the film-strengthening solution.

The development of coating properties can also be accelerated by immersion of the coated substrate in water or conditioning in an atmosphere with a relative humidity of at least 50%, preferably at least 80%. Such a process may further include the treatment with a film strength-enhancing solution. Such a process is the subject of a separate patent application.

When fast drying is not an issue, it is possible to let a non-post-treated coating dry at low relative humidity, for instance between 25 and 50% relative humidity. The development of the coating properties will proceed more slowly, but eventually good coating properties are obtained.

The time to touch dry is generally about 10 to 15 minutes at ambient temperatures of 15 to 20° C. or 3 to 4 minutes at 40° C. for a 15-20 μm dry film thickness (dft) coating. The drying time is also dependent on air flow and film thickness. At 35° C. and 0.5 m/s air flow, the drying time for a 20 μm dry film thickness coating is approximately 2 minutes. This time can be further reduced by increasing the air temperature.

In general, the drying time can be reduced by increasing the substrate temperature, increasing the air temperature, using an air flow, or by any combination thereof. It is preferred to carry out drying of the primer coating at 10-60° C., preferably 25-50° C. in a forced air flow, preferably in an air flow of at least 0.1 m/s, especially if primer coating, drying, and application of the optional film-strengthening solution are to be carried out in an on-line process. Achieving fast drying is very important for on-line application in shipyards or steel mills.

Application of the treatment solution before the primer is touch dry does not give film strengthening.

The solution which increases the film strength of the primer coating will in general be an aqueous solution of an inorganic salt or a solution of a material having reactive silicon-containing groups. The increase in film strength can be detected by a significant increase in hardness, abrasion resistance, and usually adhesion. Hardness can be measured with the aid of the pencil hardness test of British Standard 3900, part E19 (1999) (hardness of pencil required to gouge the coating). Abrasion resistance can be measured using a double rub test which automatically rubs the coating and can be carried out dry or wet with water. While a significant increase in either dry or wet abrasion resistance would be regarded as an increase in film strength of the primer coating, we have found that the treatment according to the invention generally increases both dry and wet abrasion resistance. Adhesion can be measured by a cross hatch test as described in British Standard 3900, part E6 (1992).

The amount of film-strengthening solution applied to the primer coating is generally in the range of 0.005-0.2, preferably 0.01-0.08 liter per square meter of primer coated surface ($L/m^2$) for coatings applied at standard dry film thickness (15-20 μm). Such an amount of solution can conveniently be applied by spraying. Needless to say, the concentration or the volume of the post-treatment solution should be increased if the coating is over-applied, i.e. in a dry film thickness>20 μm.

Washing has previously been suggested as a post-treatment for zinc silicate coatings based on an alkali metal silicate binder, but this has involved the application of larger amounts of water to wash soluble alkali metal salts from coatings having $SiO_2/M_2O$ ratios of about 3:1 to 4:1. Spray application of an equivalent amount of water alone or passing the primer through a steam chamber on line at typical line speeds (i.e. an exposure time<2 min.) does not give substantial film strengthening.

While we do not wish to be bound by any theory explaining the film strengthening, it appears that when the treatment solution is an aqueous inorganic salt solution, either silica dissolution and reprecipitation take place or the salt acts as a reinforcing agent between the sol particles. When the treatment solution contains reactive silica species, these can be deposited between the silica sol particles to improve their bonding. We have found that the same strengthening materials, when added to the primer coating composition at or before application to the substrate, do not strengthen the primer coating film formed.

When the optionally applied film-strengthening solution is an aqueous solution of an inorganic salt, it generally has a concentration of at least 0.01M and preferably of at least 0.03M. The concentration of the inorganic salt solution can be up to 0.5M or 1M or even higher. The inorganic salt can be the salt of a monovalent cation such as an alkali metal or ammonium salt, of a divalent cation such as zinc, magnesium, calcium, copper (II) or iron (II), of a trivalent cation such as aluminium or cerium (III), or of a tetravalent cation such as cerium (IV), and of a monovalent anion such as a halide, for example fluoride, chloride or bromide, or nitrate, or a polyvalent anion such as sulphate or phosphate. Mixtures of the above-mentioned salts can also be used. Examples of inorganic salt solutions which have been found effective are magnesium sulphate, zinc sulphate, potassium sulphate, aluminium sulphate, iron sulphate, cerium (IV) sulphate, copper sulphate, sodium chloride, and potassium chloride, although chlorides might not be preferred because of their tendency to promote corrosion. The concentration of the inorganic salt solution in weight terms preferably is in the range of 0.5-20% by weight.

One example of a material having active silicon-containing groups is a silicate. The film-strengthening solution can be an alkali metal silicate solution, for example potassium silicate or lithium silicate, or an ammonium silicate solution, or it can be an alkali metal siliconate, for example an alkyl siliconate solution. The preferred concentration of such a solution is in the range of 0.5-20% by weight.

When the film-strengthening solution is a solution of an inorganic salt or alkali metal silicate, the added material will increase the salt content of the zinc silicate primer coating. This will tend to increase the osmotic driving force when the coating is overcoated and thus the possibility of osmotic blistering when the coated substrate is immersed. The amount of inorganic salt of alkali metal silicate applied preferably is low enough for the $SiO_2/M_2O$ mole ratio of the primer coating binder to be kept above 6:1, preferably above 8:1, and most preferably above 10:1. To achieve this, the amount of inorganic salt or alkali metal silicate applied in the film-strengthening solution preferably is less than 10 g/m$^2$ on a dry weight basis, most preferably less than 5 g/m$^2$, for a coating with a dry film thickness of 15-20 μm.

An alternative example of a material having reactive silicon-containing groups is an alkoxy silane or an acyloxy silane, for example acetoxy silane. This can for example be a tetraalkoxy silane (alkyl orthosilicate) such as tetraethoxy silane or tetraisopropoxy silane, or a trialkoxy silane such as methyl trimethoxy silane (MTMS, ex Aldrich) or bistrimethoxy silane ethane. The alkoxy silane may contain additional functional groups, for example a trialkoxy silane can have the formula $RSi(OR^1)_3$, wherein each $R^1$ group is 1-3C alkyl and R is an alkyl or aryl group substituted by an amino, alkylamino, dialkylamino, amide, halogen, carbamate, epoxide, isocyanate, aziridine, sulphonate, carboxylate, phosphate or hydroxyl group. Preferred examples are aminosilanes such as triethoxy silyl propylamine (Aminosilane A1100 ex Witco), trimethoxy silyl propylamine (Aminosilane A1110 ex Witco), trimethoxy silyl propylethylene diamine (Aminosilane A1120 ex Witco), trimethoxy silyl propyldiethylene triamine (Aminosilane A1130 ex Witco) or bistrimethoxy silyl propylethylene diamine. Further, the alkoxysilane can be a bis(trialkoxy silane), for example an alkylene or polydimethyl silane chain tipped with —$SiOR'_3$ groups. The alkoxy silane can be at least partially hydrolyzed, for example a partially hydrolyzed tetraalkoxy silane or a hydrolyzed alkyl trialkoxy silane or aminoalkyl trialkoxy silane can be used. The alkoxy silane is preferably applied from aqueous solution, although the aqueous solution can contain a water-miscible organic solvent, for example an alcohol such as ethanol.

Further, it was found that orthosilicates also are very effective property enhancers in the post-treatment process. Aqueous solutions of tetramethyl orthosilicate (TMOS) and tetraethyl orthosilicate (TEOS) are effective post-treatment agents. Better results are obtained if TMOS or TEOS is hydrolyzed at pH 1-2. At this pH the pot life of the post treatment solution can even exceed 7 days.

The concentration of alkoxy silane or orthosilicates in the optionally applied treatment solution preferably is in the range of 1-25% by weight.

The use of alkoxy silanes and/or orthosilicates in the optionally applied post-treatment solution is preferred, since these compounds add virtually zero level of water-soluble salts to the shop primer.

The optional application of the treatment solution, and preferably also the drying of the treated primer coating until the coating is again touch dry, can be carried out in an on-line process following primer coating of the steel and drying of the primer coating until it is touch dry. The amount of film-strengthening solution applied preferably is 0.005-0.2 L/m$^2$ of primer coated surface, most preferably 0.08 L/m$^2$ or less if the coating is treated and dried on-line for a coating with a dry film thickness of 15-20 μm. The drying time for this coating treated with such an amount of film-strengthening solution generally is about 5 to 10 minutes at 15-20° C. or about 1.5 to 2 minutes at 40° C. The drying time can be further reduced by placing the primed substrate in an air flow.

In general, the drying time can be reduced by increasing the substrate temperature, increasing the air temperature, using an air flow, or by any combination thereof.

The optionally applied treatment solution is preferably applied and dried at a temperature in the range of 10-60° C., preferably 25-50° C. in a forced air flow, preferably in an air flow of at least 0.1 m/s. The treatment solution can be applied by standard spray application equipment, for example airless spray or HVLP spray, or by a simple atomizer spray, simply by mounting a second spray gun further down the shop primer line from the spray gun applying the primer. Alternatively, the solution can be applied by using a mist coating application technique. The treatment solution can be applied to both sides of a substrate, for example to both sides of a steel plate for use in shipbuilding, irrespective of the orientation of the substrate; the volume of solution required to strengthen the film is such that the solution can be applied to the underside of a plate without sagging or dripping. Other methods of application such as application by roller are possible but not preferred. The treated primer coating only needs to be allowed to dry on the substrate and does not require any subsequent washing or heating; once the treated primer is dry, the coated product can be handled normally.

The optional treatment process increases the hardness, cohesion, and abrasion resistance of the shop primer without introducing the disadvantage of blistering when overcoated. Further, the treatment process accelerates the development of these favourable properties. This improves the resistance to damage during handling and fabrication in a shipyard or steel mill. In addition to these benefits, the post-treated shop primed substrate shows the performance characteristics required in the shop primer market, viz. corrosion resistance of 6 months on outdoor exposure, excellent welding/cutting characteristics and overcoatability with a wide range of primer coatings without blistering or pinholing.

For example, when a zinc-filled silica sol coating is post-treated with a film strength-enhancing solution, the dry abrasion resistance 10 minutes after application of the coating is increased at least fivefold while the wet abrasion resistance is usually increased tenfold or more. The pencil hardness typically changes from 2B to H or harder. The $SiO_2/M_2O$ mole ratio of the primer coating may for example be reduced from 50-200 to 15-35 if the film-strengthening solution applied is an inorganic salt solution or an alkali metal silicate solution, but at normal dry film thickness of 15-20 μm for shop primer coatings this is still above the level at which significant blistering occurs. The $SiO_2/M_2O$ mole ratio can be maintained at an even higher level if the film-strengthening solution is an alkoxy silane solution. The treated primer coatings can be overcoated with an amine-cured epoxy resin coating, or any other heavy-duty coating such as a polyurethane, at a film thickness of 100 μm or 200 μm, and after being allowed to cure for 7 days can be immersed in fresh or sea water for over 6 months (longest test period thus far) at 40° C. without blistering.

The invention will be elucidated with reference to the following examples. These are intended to illustrate the invention but are not to be construed as limiting in any manner the scope thereof.

The determination of the sol size of the silica sols used in the examples has been performed via the titration method described in G. W. Sears, *Anal. Chem.* 12, 1981 (1956). By means of this method, the specific surface area has been determined in square meters per gram. For the spherical sol particles, this surface area was converted to a particle size.

The determination of the weight percentage of alumina on the alumina modified silica sols used in the examples has been performed by means of X-ray fluorescence spectroscopy.

The compounds used as starting material in the examples have the following origin:

| | |
|---|---|
| LUDOX ® SM | a silica sol of concentration 30% by weight, particle size 7 nm, $SiO_2/Na_2O$ mole ratio 50:1, ex DuPont, pH 10.3 |
| BINDZIL 25AT/360 | alumina-modified silica sol of concentration 22-27% by weight, average particle size 7 nm, $SiO_2/Na_2O$ mole ratio 50:1, ex. Akzo Nobel (Eka Chemicals), pH 9.8-10 |
| NYACOL | a silica sol of concentration 40% by weight and average particle size 16 nm, $SiO_2/Na_2O$ mole ratio 105:1, ex Akzo Nobel (Eka Chemicals), pH 9.8 |
| NYACOL Al | an alumina-modified version of Nyacol, pH 9.9 |
| XZ 94770 | a styrene/butadiene organic latex of 50 vol. % solids, ex Dow Chemicals. |
| HUBER 90C | a calcined aluminium silicate extender pigment of 0.7 μm mean particle size, ex J M Huber/Marlow Chemicals |
| Zinc dust | a 7 μm mean particle size metal powder, ex Trident Alloys |
| MOLYWHITE 212 | calcium zinc molybdate, an anticorrosive pigment of particle size 4.1 μm, ex Sherwin Williams |
| MINEX 20 | a sodium potassium aluminium silicate extender pigment of 2.95 μm mean particle size, ex North Cape Minerals |
| BENTONE EW | a sodium magnesium silicate thixotrope, ex Elementis |

Examples 1 to 5

To determine the effect of alumina content on the pot life of shop primer coatings, several compositions having a solids concentration of 28% by volume were prepared. The primer coatings had a pigment volume concentration of 71.0%, which is 1.4 times the critical pigment volume concentration.

The composition used in Example 1 was prepared from the following ingredients.

| Component | % by weight |
|---|---|
| Silica sol | 30.6 |
| Water | 13.5 |
| Bentonite clay thixotrope | 0.2 |
| Zinc dust | 48.2 |
| HUBER 90C | 7.5 |

For Examples 2 to 5, compositions were prepared using the following ingredients.

| Component | % by weight |
|---|---|
| Silica sol | 36.0 |
| Water | 8.1 |
| Bentonite clay thixotrope | 0.2 |
| Zinc dust | 48.2 |
| HUBER 90C | 7.5 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels in a dry film thickness of 15-20 μm at 35° C. and 30% relative humidity. The primer was allowed to dry under ambient conditions (20° C., 60% RH).

The pot life is the time, after mixing of all components, when after application of the coating a reduction of the properties of the coating 1 hour after application is observed. In these experiments, a 50% reduction in coating properties measured 1 hour after the coating's application was taken to indicate that the pot life had been exceeded.

TABLE 1

| Example No | Silica sol | wt. % alumina | Pot life |
|---|---|---|---|
| 1[1] | LYDOX ® SM | — | 30-60 min |
| 2 | BINDZIL 25AT/360 | 0.27 | 4-6 hrs |
| 3 | BINDZIL 25AT/360 | 0.39 | 24-48 hrs |
| 4 | BINDZIL 25AT/360 | 0.49 | >48 hrs |
| 5 | BINDZIL 25AT/360 | 0.69 | >60 hrs |

[1]Comparative example

Examples 6 to 9

The shop primer compositions of Examples 1, 2, 3, and 4 were prepared. 0.5, 1.5, 4, 6, and/or 24 hours after mixing of the components, the compositions were applied to 15 cm×10 cm steel panels in a dry film thickness of 15-20 μm at 35° C. and 30% relative humidity. The primer was allowed to dry under ambient conditions (23° C., 60% RH).

The abrasion resistance of the applied coating was measured (double rub test) after 1 hour and after 24 hours. In the double rub test the surface is wetted with a couple of drops of water (in the case of wet double rubs), then rubbed with a cotton wool swab using light pressure. One pass to and fro is a double rub. The results are expressed as the number of double rubs till removal of the coating. If the coating survives 100 double rubs, the final dry film thickness (dft) is compared to the initial value. If the dry film thickness is reduced by more than 25%, the result is expressed as >100. If the dry film thickness is reduced by less than 25%, the result is expressed as >>100.

The results are shown in Table 2 below.

TABLE 2

| Example No | Silica sol | wt. % alumina | time between mixing and application (h) | WDR 1 hour | WDR 24 hours |
|---|---|---|---|---|---|
| 6a[1] | LUDOX SM | — | Fresh (0) | 70 | >>100 |
| 6b[1] | LUDOX SM | — | 0.5 | 42 | >100 |
| 6c[1] | LUDOX SM | — | 1.5 | 6 | 14 |
| 6d[1] | LUDOX SM | — | 4 | 2 | 2 |
| 7a | BINDZIL 25AT/360 | 0.27 | Fresh (0) | 60 | >>100 |
| 7b | BINDZIL 25AT/360 | 0.27 | 0.5 | 20 | >>100 |
| 7c | BINDZIL 25AT/360 | 0.27 | 6 | 13 | >100 |
| 7c | BINDZIL 25AT/360 | 0.27 | 24 | 8 | 24 |
| 8a | BINDZIL 25AT/360 | 0.39 | Fresh (0) | 60 | >>100 |
| 8b | BINDZIL 25AT/360 | 0.39 | 0.5 | 53 | >>100 |

TABLE 2-continued

| Example No | Silica sol | wt. % alumina | time between mixing and application (h) | WDR 1 hour | WDR 24 hours |
|---|---|---|---|---|---|
| 8c | BINDZIL 25AT/360 | 0.39 | 6 | 50 | >>100 |
| 8d | BINDZIL 25AT/360 | 0.39 | 24 | 50 | >>100 |
| 9a | BINDZIL 25AT/360 | 0.47 | Fresh (0) | 10 | 25 |
| 9b | BINDZIL 25AT/360 | 0.47 | 0.5 | 8 | 25 |
| 9c | BINDZIL 25AT/360 | 0.47 | 6 | 11 | 25 |
| 9d | BINDZIL 25AT/360 | 0.47 | 24 | 12 | 27 |

[1]Comparative example
[2]Coating composition gelled before application to the substrate Examples 10 to 13

The shop primer compositions of Examples 1, 2, 3 and 4 were prepared. 0.5, 1.5, 4, 6, and/or 24 hours after mixing of the components, the compositions were applied to 15 cm×10 cm steel panels in a dry film thickness of 15-20 μm at 35° C. and 30% relative humidity.

After the coating had dried to the extent that it was touch dry, it was treated with a 5% solution of partially hydrolyzed (pH=2) TEOS (tetraethyl orthosilicate) in water.

The primer was subsequently stored under ambient conditions (23° C., 60% RH). The abrasion resistance of the coating was measured (double rub test) 1 hour and 24 hours after treatment with the TEOS solution. The results are shown in Table 3 below.

TABLE 3

| Example No | Silica sol | wt. % alumina | time between mixing and application (h) | WDR 1 hour | WDR 24 hours |
|---|---|---|---|---|---|
| 10a[1] | LUDOX SM | — | 0.5 | >100 | >>100 |
| 10b[1] | LUDOX SM | — | 1.5 | 18 | >100 |
| 10c[1] | LUDOX SM | — | 4 | [2] | [2] |
| 11a | BINDZIL 25AT/360 | 0.27 | 0.5 | >100 | >>100 |
| 11b | BINDZIL 25AT/360 | 0.27 | 6 | 50 | >100 |
| 11c | BINDZIL 25AT/360 | 0.27 | 24 | 24 | 24 |
| 12a | BINDZIL 25AT/360 | 0.39 | 0.5 | >100 | >>100 |
| 12b | BINDZIL 25AT/360 | 0.39 | 6 | >100 | >>100 |
| 12c | BINDZIL 25AT/360 | 0.39 | 24 | >100 | >>100 |
| 13a | BINDZIL 25AT/360 | 0.47 | 0.5 | 27 | >>100 |
| 13b | BINDZIL 25AT/360 | 0.47 | 6 | 30 | >>100 |
| 13c | BINDZIL 25AT/360 | 0.47 | 24 | 27 | >>100 |

[1]Comparative example
[2]Coating composition gelled before application to the substrate
[3]Wet double rubs measured 1 hour after treatment with TEOS
[4]Wet double rubs measured 24 hours after treatment with TEOS Example 14

To determine the effect of different methods of conditioning the coating after application, a composition with a solids concentration of 28% by volume was prepared from the following ingredients. The primer coating had a pigment volume concentration of 70%, which is 1.06 times the critical pigment volume concentration.

| Component | % by weight |
|---|---|
| Silica sol BINDZIL 25AT/360 (0.39 wt % alumina) | 32.5 |
| Zinc | 41.6 |
| MINEX 20 | 9.1 |
| MOLYWHITE 212 | 2.2 |
| BENTONE EW | 0.2 |
| Water | 12.6 |
| XZ94770 | 1.8 |

A primer was prepared by mixing the silica sol with water and Bentone and the resulting binder was mixed with the pigments just before application to the steel. The obtained primer coating was applied to 15 cm×10 cm steel panels in a dry film thickness of 15-20 μm at 35° C. and 30% relative humidity. The primer was allowed to dry under ambient conditions (20° C., 60% RH).

In experiment 14a, after the coating had dried to the extent that it was touch dry, it was treated with a 5% ZnSO₄ solution in water.

In experiment 14b, the coated panels were stored at 23° C., 60% RH.

In experiment 14c, the coated panels were stored at 23° C., 35% RH.

The abrasion resistance of the coating layers was measured (double rub test) 10 minutes, 1 hour, and 24 hours after conditioning. In addition, the pencil hardness was measured. The results are shown in Table 4 below.

TABLE 4

| Example No | Conditioning following application | WDR/PH 10 min[1] | WDR/PH 1 hour[2] | WDR/PH 24 hours[3] | WDR/PH 48 hours[4] |
|---|---|---|---|---|---|
| 14a | 5% ZnSO₄ | >>100/6H | >>100/6H | Not measured | Not measured |
| 14b | 23° C., 60% RH | 28/2H | >>100/4H | >>100/6H | Not measured |
| 14c | 23° C., 35% RH | 20/HB | 25/H | 53/4H | >>100/4H |

[1]Wet double rubs and pencil hardness measured 10 minutes after conditioning
[2]Wet double rubs and pencil hardness measured 1 hour after conditioning
[3]Wet double rubs and pencil hardness measured 24 hours after conditioning
[4]Wet double rubs and pencil hardness measured 48 hours after conditioning Examples 15 and 16

To show the effect of alumina modification on the pot life and on the rate of property development for large sols, a formulation was prepared with a solids concentration of 28% by volume and a pigment volume concentration of 50%, which is 0.72 times the critical pigment volume concentration.

The formulation was prepared from the following ingredients.

| Component | % by weight |
|---|---|
| Silica sol | 35.0 |
| Zinc | 42.2 |
| MINEX 20 | 1.7 |

-continued

| Component | % by weight |
| --- | --- |
| MOLYWHITE | 2.2 |
| BENTONE EW | 0.2 |
| Water | 15.6 |
| XZ94770 | 3.1 |

Two primers with this formula were prepared using two different silica sols, namely a 16 nm NYACOL sol for Comparative Example 15 and a 16 nm NYACOL Al sol for Example 16. The obtained primer coatings were applied to 15 cm×10 cm steel panels immediately, 2 hours, 5 hours and 24 hours after mixing the composition in a dry film thickness of 15-20 μm at 35° C. and 30% relative humidity. The primers were allowed to dry under ambient conditions (20° C., 60% RH).

The abrasion resistance of the coating layers was measured (double nib test) after 1 and 24 hours following application of the coatings. In addition, the pencil hardness was measured. The results are shown in Table 5 below.

TABLE 5

| Example No. | Silica sol | wt. % alumina | Time between mixing and application (h) | WDR/PH 1 hour[2] | WDR/PH 24 hours[3] |
| --- | --- | --- | --- | --- | --- |
| 15a[1] | NYACOL 16 nm | — | Fresh (0) | 35/HB | >>100/3H |
| 15b[1] | NYACOL 16 nm | — | 2 | 5/3B | |
| 15c[1] | NYACOL 16 nm | — | 24 | [4] | |
| 16a | NYACOL Al 16 nm | 0.4 | Fresh (0) | 30/HB | >>100/H |
| 16b | NYACOL Al 16 nm | 0.4 | 2 | 23/HB | |
| 16c | NYACOL Al 16 nm | 0.4 | 5 | 18/HB | |
| 16d | NYACOL Al 16 nm | 0.4 | 24 | 14/HB | |

[1]Comparative example
[2]Wet double rubs and pencil hardness measured 1 hour after application
[3]Wet double rubs and pencil hardness measured 24 hours after application
[4]Coating composition gelled before application to the substrate Examples 17 and 18

To determine the effect of the size of alumina-treated sols on the film properties of shop primer coatings, two compositions having a pigment volume concentration of 50% were prepared. For Example 17, a composition was prepared from the following ingredients.

| Component | % by weight |
| --- | --- |
| Silica sol BINDZIL 25AT/360 (7 nm) 26.5 wt % in water | 50.8 |
| Zinc | 42.2 |
| MINEX 20 | 3.5 |
| MOLYWHITE 212 | 2.2 |
| BENTONE EW | 0.2 |
| Water | — |
| XZ94770 | 3.1 |

For Example 18, the composition of Example 16 was prepared. The primers were allowed to dry under ambient conditions (23° C., 60% RH).

The abrasion resistance of the coating layers was measured (double rub test) 1 hour and 24 hours after application. In addition, the pencil hardness was measured. The results are shown in Table 6 below.

TABLE 6

| Example No | Silica sol | Sol size | wt. % alumina | WDR/PH 1 hour[1] | WDR/PH 24 hours[2] |
| --- | --- | --- | --- | --- | --- |
| 17 | BINDZIL 25AT/360 | 7 nm | 0.44 | 25/H | >>100/3H |
| 18 | NYACOL Al | 16 nm | 0.44 | 30/HB | >>100/3H |

[1]Wet double rubs and pencil hardness measured 1 hour after application
[2]Wet double rubs and pencil hardness measured 24 hours after application Examples 19 to 21

To show the effect of alumina modification and of the addition of dimethyl amino ethanol (DMAE) as a secondary pot life extender on the rate of property development and on the pot life for small sols, several compositions were prepared.

The primer coatings had a pigment volume concentration of 50.0%, which is 0.72 times the critical pigment volume concentration.

For Example 19, a composition having a solids concentration of 28% by volume was prepared from the following ingredients.

| Component | % by weight |
| --- | --- |
| LUDOX ® SM 7 nm | 46.7 |
| Zinc | 42.2 |
| MINEX 20 | 1.7 |
| MOLYWHITE 212 | 2.2 |
| BENTONE EW | 0.2 |
| Water | 3.9 |
| XZ94770 | 3.1 |

For Example 20, a composition having a solids concentration of 26% by volume was prepared from the following ingredients.

| Component | % by weight |
| --- | --- |
| BINDZIL 25AT/360 7 nm (0.44 wt. % alumina) | 50.7 |
| Zinc | 42.2 |
| MINEX 20 | 1.6 |
| MOLYWHITE 212 | 2.2 |
| BENTONE EW | 0.2 |
| XZ94770 | 3.1 |

For Example 21, the composition of Example 20 was prepared and mixed with DMAE. The amount of DMAE in the mixture was 1% by weight, based on the total weight of the mixture.

The abrasion resistance of the coating layers was measured (double rub test) 1 hour after application. In addition, the pencil hardness was measured. In these experiments, a 50% reduction in coating properties measured 1 hour after the coating's application was postulated to indicate that the pot life had been reached. The results are shown in Table 7 below.

TABLE 7

| Example No | Silica sol | wt. % alumina | wt. % DMAE | Time between mixing and application (h) | WDR/PH 1 hour[2] | Pot life |
| --- | --- | --- | --- | --- | --- | --- |
| 19a[1] | LUDOX SM | — | — | Fresh (0) | 33/HB | <30 min |
| 19b[1] | LUDOX SM | — | — | 0.5 | 12/B | |
| 19c[1] | LUDOX SM | — | — | 1 | 4/B | |

TABLE 7-continued

| Example No | Silica sol | wt. % alumina | wt. % DMAE | Time between mixing and application (h) | WDR/ PH 1 hour[2] | Pot life |
|---|---|---|---|---|---|---|
| 20a | BINDZIL 25AT/360 | 0.44 | — | Fresh (0) | 32/HB | ~1 hr |
| 20b | BINDZIL 25AT/360 | 0.44 | — | 0.5 | 26/HB | |
| 20c | BINDZIL 25AT/360 | 0.44 | — | 1 | 18/B | |
| 20d | BINDZIL 25AT/360 | 0.44 | — | 2 | 8/B | |
| 21a | BINDZIL 25AT/360 | 0.44 | 1 | Fresh (0) | 67/H | 2-4 hrs |
| 21b | BINDZIL 25AT/360 | 0.44 | 1 | 0.5 | 64/H | |
| 21c | BINDZIL 25AT/360 | 0.44 | 1 | 1 | 64/HB | |
| 21d | BINDZIL 25AT/360 | 0.44 | 1 | 2 | 51/HB | |
| 21e | BINDZIL 25AT/360 | 0.44 | 1 | 4 | 29/HB | |

[1]Comparative example
[2]Wet double rubs and pencil hardness measured 1 hour after application

The invention claimed is:

1. A shop primer coating composition for steel substrates comprising a silica binder, the binder comprising an alumina-stabilized aqueous silica sol, wherein said alumina-stabilized silica sol is an alumina surface-modified silica sol formed by mixing a partially de-ionized silica sol with an aqueous solution of sodium aluminate, said binder having a $SiO_2/M_2O$ mole ratio, wherein M represents the total of alkali metal and ammonium ions, of at least 50:1, and said binder having a pH in the range of 9 to 11.5, said coating composition containing zinc powder and/or a zinc alloy.

2. A primer coating composition according to claim 1, wherein the binder is an alumina-modified silica sol comprising 0.05 to 2.0 wt. % of alumina, calculated as the percentage by weight of $Al_2O_3$ based on the silica sol, and any silicate particles present in the composition.

3. A primer coating composition according to claim 1, wherein the silica and any silicate particles have an average size equal to or smaller than 22 nm.

4. A process for primer coating steel which is intended to be fabricated and overcoated, comprising
coating a steel substrate with a shop primer coating comprising a silica binder, the binder comprising an alumina-stabilized aqueous silica sol, wherein said alumina-stabilized silica sol is an alumina surface-modified silica sol formed by mixing a partially de-ionized silica sol with an aqueous solution of sodium aluminate, said binder having a $SiO_2/M_2O$ mole ratio, wherein M represents the total of alkali metal and ammonium ions, of at least 50:1, and said binder having a pH in the range of 9 to 11.5, and containing zinc powder and/or a zinc alloy;
drying said primer coating at a temperature of from 10° C. to 60° C. to a dry film thickness of less than 40 microns; and
optionally treating the primer coating with a film strengthening solution after the primer coating has dried to the extent that it is touch dry.

5. A process according to claim 4, wherein the binder comprises 0.05 to 2.0 wt. % of alumina, calculated as the percentage by weight of $Al_2O_3$ based on the silica sol, and any silicate particles in the composition.

6. A process according to claim 4, wherein the silica particles have an average size equal to or smaller than 22 nm.

7. A process according to claim 6, wherein the silica particles have an average size equal to or smaller than 16 nm.

8. A process according to claim 4, wherein the primer coating further comprises zinc powder and/or a zinc alloy.

9. A process according to claim 4, wherein the primer coating further comprises an organic resin said organic resin being a latex dispersion.

10. A process according to claim 4, wherein after the primer coating has dried to the extent that it is touch dry, the coated substrate is immersed in water or alternatively kept in an atmosphere with a relative humidity of at least 50%.

11. A process according to claim 4, wherein the pH of the silica binder is adjusted to a pH in the range 9.5 to 11.

* * * * *